United States Patent [19]

Mattern

[11] B 4,011,412
[45] Mar. 8, 1977

[54] METHOD OF OPERATING A PCM TIME-DIVISION MULTIPLEX TELECOMMUNICATION NETWORK

[75] Inventor: Alfred Mattern, Grobenzell, Germany

[73] Assignee: Siemens Aktiengesellschaft, Munich, Germany

[22] Filed: Aug. 14, 1974

[21] Appl. No.: 497,293

[44] Published under the second Trial Voluntary Protest Program on March 30, 1976 as document No. B 497,293.

[30] Foreign Application Priority Data

Aug. 14, 1973 Germany .......................... 2341115

[52] U.S. Cl. ....................... 179/15 BA; 179/15 AL
[51] Int. Cl.² ........................................ H04Q 11/04
[58] Field of Search ................... 179/15 AL, 15 BA

[56] References Cited

UNITED STATES PATENTS

| | | | |
|---|---|---|---|
| 3,586,782 | 6/1971 | Thomas | 179/15 AL |
| 3,643,030 | 2/1972 | Sparrenoahl | 179/15 AL X |
| 3,731,002 | 5/1973 | Pierce | 179/15 AL |
| 3,752,932 | 8/1973 | Frisone | 179/15 AL |

*Primary Examiner*—Kathleen H. Claffy
*Assistant Examiner*—Joseph Popek

[57] ABSTRACT

A method of operating pulse code modulated time division multiplex networks in which the subscriber stations participating in a connection receive the information intended for them on the basis of an interpretation of their respective address. The address is transmitted from the sending end exchange in conjunction with the message signals. The message signals to be transmitted are produced from a given subscriber station responsive to that subscriber station receiving its own address transmitted from the terminal exchange in the time slot allocated to the connection in question. This occurs while the subscriber stations modulate and relay in the direction of transmission the unmodulated byte received after their addresses in accordance with the message signals to be delivered by them.

4 Claims, 2 Drawing Figures

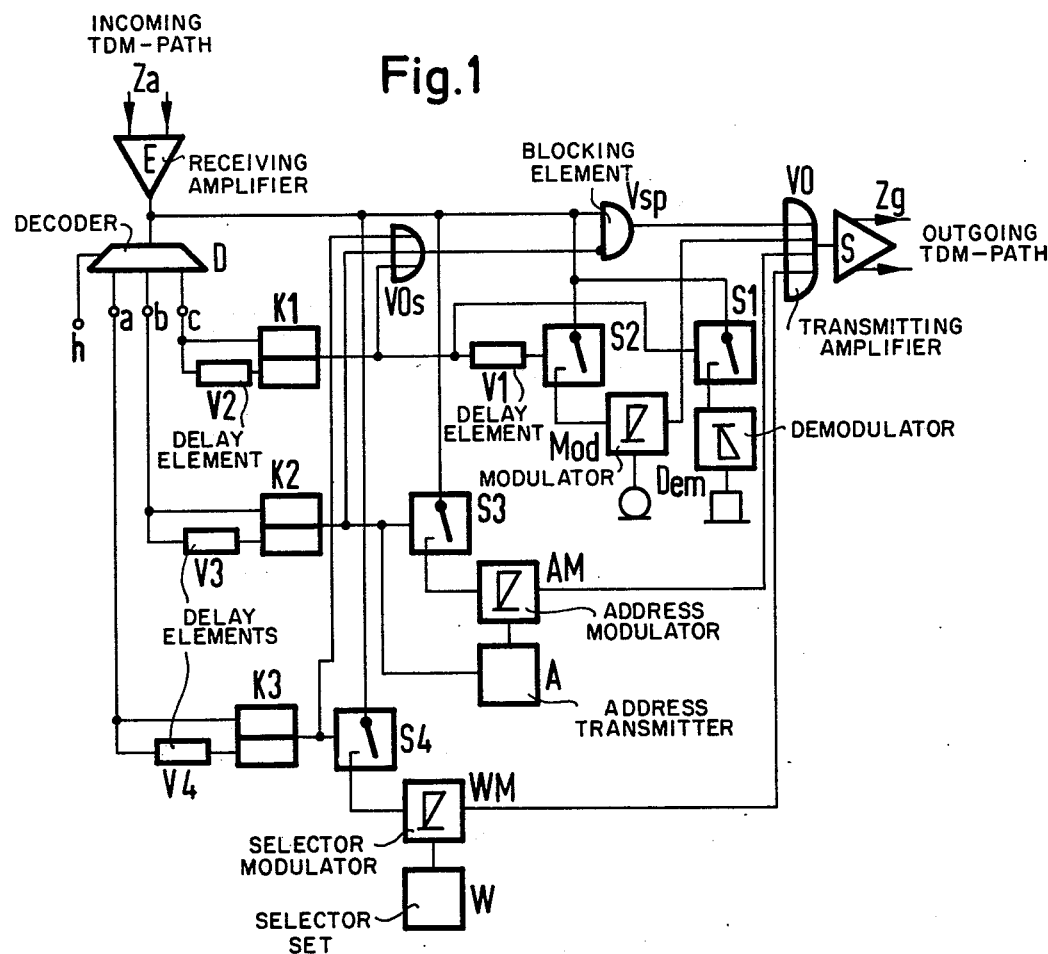

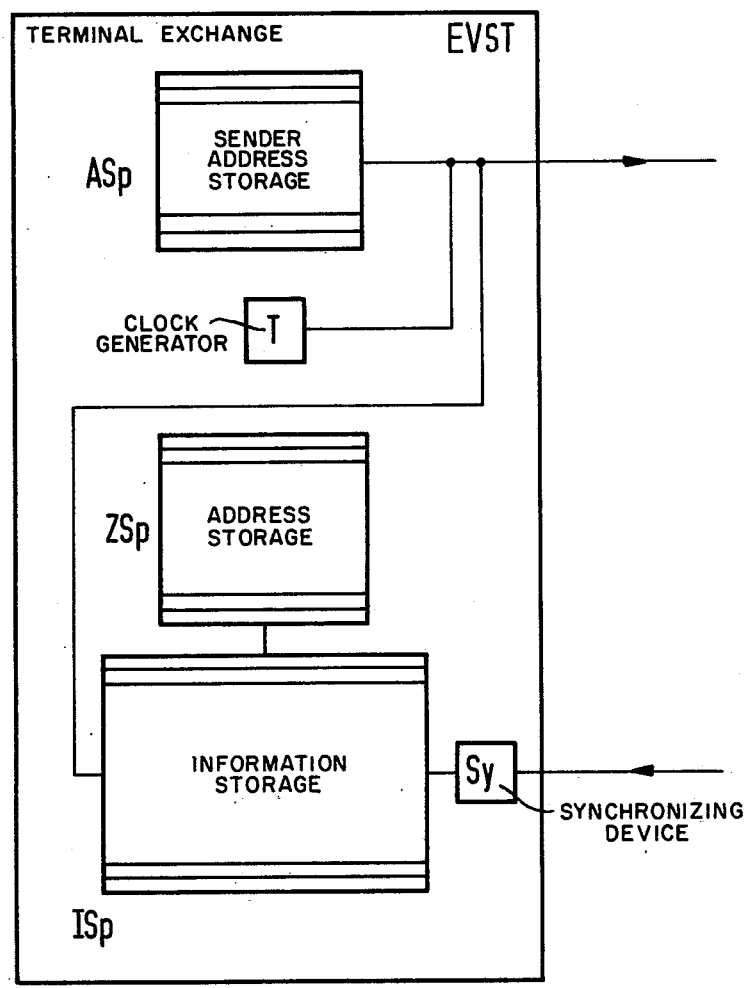

METHOD OF OPERATING A PCM TIME-DIVISION MULTIPLEX TELECOMMUNICATION NETWORK

BACKGROUND OF THE INVENTION

The development of transmitting media having a large wideband characteristic, e.g. in the form of glass fiber circuits over which laser beams are transmitted as information carriers, has led to proposals to introduce a complete decentralized switching system into pulse code modulated (PCM) time-division multiplex telecommunication networks.

In a solution of this kind known in the art (West German Unexamined Disclosure Publication No. 1,804,624), the basic form of the communication network comprises a number of subscriber line circuits linked together by a directional transmission line closed in the form of a loop. This loop comprises as a single central member a clock station, the function of which is to determine a number of time multiplexors in the loop. In order to be able to establish a connection, the subscriber stations monitor, by means of individual detectors, the time slots for the appearance of an idle-channel signal. Upon the detection of an idle-channel, they occupy it by means of a synchronizing circuit likewise allocated to individual subscribers and periodically connected to the line during the time interval constituting the channel. The called subscriber detects with the aid of an address detector his address transmitted in the occupied time slot from the dialing subscriber station and ensures with the aid of his synchronizing circuit that he is connected periodically to the transmission line during the time intervals constituting the channel.

Another known technique when employing a wideband transmitting medium is to switch in a decentralized way, such that the subscriber line circuits disconnect the portion of the entire flow of information fed to each subscriber and intended for them by virtue of the destination address transmitted at the same time (see, e.g., NTZ Report 14, 1972, pp. 23–26). However, in this case, too, central equipment is still needed, viz. storages disposed in the network junctions designed for the prevention of undue superimposition of message blocks entering the junctions from various directions.

Thus, the advantages resulting from decentralized switching and residing mainly in the fact that a communication network operated in this fashion can be expanded without having taken appropriate measures for future expansion originally are regated by the large amount of components for the subscriber line circuits and by the fact that the advantages are not fully utilized, because, as mentioned above, central facilities cannot fully be dispensed with. However, even if one adheres to a centralized end exchange because of the above or other reasons, the possibilities offered by wideband transmitting media can be used to advantage.

An object of the invention is to provide a method of operation for a PCM time-division multiplex telecommunication network in which the through-connection to receiving subscriber stations occurs as a result of destination addresses interpreted at the receiving end, in which the expenditures for equipment allocated to individual subscribers and in which synchronization difficulties during the switching process are avoided.

SUMMARY OF THE INVENTION

The invention achieves the foregoing and other objects by providing a method of operating a PCM time-division multiplex telecommunication network in the area of the terminal exchanges of the time-division multiplex system. According to the inventive method the subscriber stations participating in a connection receive the PCM information intended for them responsive to an interpretation of their address which was transmitted from the terminal exchange at the sending end in conjunction with the message signals. The message signals to be transmitted are produced from the subscriber stations responsive to their receiving their own addresses transmitted from the terminal exchange in the time slot allocated to the connection in question while the subscriber stations modulate and relay in the direction of transmission the unmodulated byte received after their address in accordance with the message signals to be delivered by them.

BRIEF DESCRIPTION OF THE DRAWINGS

The principles of the invention will be more readily understood by reference to the description of a preferred embodiment of apparatus capable of performing the method given hereinbelow in conjunction with the two figure drawings, which are described briefly below.

FIG. 1 is a block-schematic diagram of the parts of a subscriber station required for carrying out the method according to the invention.

FIG. 2 is a schematic diagram of the parts of an terminal exchange which play a role in performing the method according to the invention.

DETAILED DESCRIPTION OF THE DRAWINGS

In the course of a connection already established, the subscriber address, then the message signal intended for that subscriber and, thereafter, a group of unmodulated bits are sent to a subscriber station in the time slot allocated by the terminal exchange EVST. The latter terminal exchange is of conventional construction, and in fact is constructed like transit exchanges having address memories which are well known in the art, as indicated by U.S. Pat. No. 3,678,205. For purposes of address transmission, a sender address storage ASp (FIG. 2) having a number of storage rows corresponding to the number of channels, into which subscriber addresses are written according to the time slot allocation, was read out in the end exchange in cyclic order. Following the readout of an address a clock generator T produces the group of unmodulated bits to be transmitted after the address is activated (FIG. 2). The address storage ASp discussed hereinabove is constructed and operates in the same way as the address storage of transit exchanges such as the one described in U.S. Pat. No. 3,678,205. That is, in accordance with a specified time slot allocation, addresses are written in the storage locations assigned to the individual time slots, and from these locations they are reread in a cyclic sequence and are thus available for the desired time slot. Any differences between the sender address storage described herein and the address storages referred by the reference numerals 18 or 34 in the aforementioned patent are differences in operation. The difference between the operation of the address storage ASp and that of the address storages in the aforementioned patent lies in the fact that the addresses read from the sender address storage described are sent directly to a TDM trunk, while addresses read from the address storage in the patent are utilized for activating an information storage. It can, therefore, be seen that this would involve no difference in construction.

The subscriber address and the byte following thereafter travels to a receiving amplifier E of a subscriber station over a time-division multiplex path Za (Fig. 1). If the address arriving at the subscriber station is not its own address, then the address and unmodulated byte travel further via the blocking element Vsp, the OR element VO and the transmitting amplifier S to the continuing portion Zg of the time-division multiplex path, by means of which they can travel to subsequent subscriber stations.

However, if the incoming address is the address of the subscriber station in question, it is decoded by a decoder D, and this results in the appearance of a signal at its output $a$. The output signal sets a bistable flip-flop K1, with the output signal of which a switch S1 is changed to the connected condition. In this way, a connection is established between the line connected to the output of the receiving amplifier and demodulator Dem by switch S1, so that the unit of information transmitted after the address can be demodulated and can travel to the subscriber set.

Because of the delay caused by the delay element V1, amounting to a time interval which is needed for the reception of the message signal following the address, the switch S2 over which the modulator Mod is connected to the output of the receiving amplifier E is activated. Hence, the unmodulated bits can now travel the the modulator and be modulated in accordance with the communication information being delivered. The modulated byte then travels via the OR element VO and via the transmitting amplifier S to the outgoing time-division multiplex path Zg.

During the demodulation and modulation process, such as they are described hereinabove, the blocking element Vsp, at whose blocking input a blocking signal is applied from the output of the flip-flop K1 via the OR element VO$s$, prevents bits appearing at the output of the receiving amplifier E from being transferred directly via the outgoing section Zg of the time-division multiplex path. After the delay time caused by the delay element V2 and corresponding to the time needed for receiving information and unmodulated byte lapses, the flip-flop K1 is switched back, so that the control signals do not appear at the switches S1 and S2, thereby reopening the contacts of the latter. At the same time, the blocking signal at the blocking element Vsp is also removed, so that signals received from the receiving amplifier E are now transferred to the outgoing section Zg of the time-division multiplex path via the blocking circuit, the OR element VO and the transmitting amplifier.

In order to be able to proceed in like manner in the case of a call setup, call addresses are transmitted in one or more specified time slots from the end exchange. These addresses are stored in specified rows of the storage ASp of the end exchange and are transmitted periodically during the cyclic readout of the storage. Subscriber stations which find themselves in the "subscriber-has-removed-receiver" condition respond to the call addresses. This is shown in FIG. 1 by a control input h of the decoder D, over which the decoder is made ready for reception in this condition. The decoding of such a call address results in the appearance of a signal at its output b of decoder D, which sets the flip-flop K2. By means of the output signal of the flip-flop, a switch S3 is changed to the connected condition, over which an address modulator AM is connected to the output of the receiving amplifier. The address modulator is connected on the other side to the outgoing section Zg of the time-division multiplex path via the OR element VO and the transmitting amplifier. At the same time, the address transmitter A is activated, so that the address of the subscriber station is now modulated upon the unmodulated byte following the call address and this said byte is relayed in the direction of transmission. After a corresponding delay time caused by the delay element V3, the flip-flop K2 returns to its original state, resulting in the opeining of the switch S3 and the deactivation of the address transmitter A.

On the basis of the address transmitted from the subscriber station, the end exchange detects the call request of the subscriber station. It allocates a specified time slot thereto for the connection by causing the entry of the subscriber address into one of the storage rows of its address storage ASp.

On the allocated time slot, the address is now transmitted to the subscriber with the request that the destination address be indicated through appropriate dialing. In this case, too, an unmodulated byte is sent to the transmission line following the address. The subscriber station reacts to this request in a manner such that it modulates the address of the call destination upon the unmodulated bits transmitted subsequently. This may occur either numerically or in the form of the coded total address. In the process, a signal appears at the output c of the decoder D which sets the flip-flop K3. The switch S4 is triggered by the output signal of the flip-flop and placed in its closed condition, so that the selector modulator WM is connected to the output of the receiving amplifier E. The unmodulated byte appended to the address by the selector set can then be modulated with the destination address and transmitted in the direction of transmission to the outgoing section Zg of the time-division multiplex path.

In the end exchange, the destination address is written into a specified row of the address storage ZSp in accordance with the allocated time slot. The storage is read out cyclically, activating in the process the information storage ISp. The construction and operation of the storages ZSp and ISp are like the construction and operation of the storages indicated by the reference numerals 16 and 42 in U.S. Pat. No. 3,678,205. It is to be noted that these storages are, as well, used in an exchange like that which is the subject of the discussion herein. That is, in the same manner as in the aforementioned patent, in the apparatus described herein addresses are obtained by reading the storage ZSp in a cyclic sequence. The storage ISp is operated acyclically by the addresses, and by this means, information written cyclically therein is transferred to the outgoing TDM trunk. Thus, the information filed therein in the form of time slots, by means of the synchronizing device Sy, is transmitted in the outgoing direction for the duration of the time slot allocated to the relevant destination address in conjunction with the address read out from the storage ASp during the interval of time and in conjunction with the unmodulated byte provided as an information carrier.

The call in the case of a call setup in the incoming direction, according to this invention, occurs such that the end exchange also sends the calling subscriber station the total byte which is likewise transmitted in the case of an established connection. The address detector D of the subscriber station then activates an acoustic or visual calling signal via the flip-flop K1, the output of which is switched over to a ringing generator with the receiver in on-hook condition. In so doing care must be taken that the calling signal can only be triggered after the aforesaid byte is received anew.

The transmission of the on-hook or clearback signal of the calling subscriber station is effected in that of the total byte made up by subscriber address, message signal byte and unmodulated carrier byte are sent to the subscriber station after placing the subscriber handset on it mounting. Only the subscriber address is sent back to the end exchange where, after entry of the address, all entries of the call setup identified by the address are erased. In this way, all further transmission that could be received from the subscriber station are taken away and the time slot utilized up to that moment is again available for new seizure. As a result of the request mentioned hereinabove, in connection with the call after renewed transmission of the total byte, it is insured that the transmission of the clearback or on-hook signal does not result in a call.

The preferred form of apparatus for execution of the method of the invention as described hereinabove, is only described as a means for setting forth the principles of the invention. It is contemplated that the described apparatus can be modified or changed, as well as other forms of apparatus used while remaining within the scope of the invention, as defined by the appended claims. Further, it is contemplated that there may be deviations from the specifically defined steps of the inventive method, or their sequence, which will remain within the scope of the invention, as defined by the appended claims.

I claim:

1. A method for operating a PCM time division multiplex telecommunications network utilizing terminal exchanges in the system wherein subscriber stations forming a connection receive the PCM information intended for them responsive to interpretation of their respective addresses which are transmitted from an exchange at the sending end in conjunction with message signals, comprising the steps of:

transmitting addresses of subscriber stations from which message signals are to be sent, from terminal exchange in said network in the time slot allocated for a given connection, producing message signals from each subscriber station responsive to that subscriber station receiving its address in the time slot allocated to said connection, and modulating in said subscriber stations an unmodulated byte sent following said addresses in accordance with the message signal to be sent and relaying the modulated result in the desired direction of transmission.

2. The method defined in claim 1 comprising the further steps of:

transmitting, for call setup, from terminal exchanges in said network in at least one specified time slot a call address to which subscriber stations desiring a connection respond in such manner that they modulate their own address on the unmodulated byte transmitted after the call address, emitting from the terminal exchange in the time slot for said connection an unmodulated byte following the address of said subscriber station desiring a connection, receiving said unmodulated byte in said subscriber station desiring a connection responsive to identification of its own address and returning to the terminal exchange a modulated address for the call destination and storing an address for said call destination in the terminal exchange for the duration of the connection.

3. The method defined in claim 1 comprising the additional steps of:

transmitting, for ringing a called subscriber station, the address thereof and an unmodulated byte from a terminal exchange which, upon repeated reception, trigger a calling signal thereat through said called subscriber station.

4. The method defined in claim 1 comprising the further steps of:

deriving an on-hook signal from the return of the subscriber address devoid of a message modulated byte to terminal exchange.

* * * * *